United States Patent
Begeja et al.

(10) Patent No.: US 7,496,978 B1
(45) Date of Patent: Mar. 3, 2009

(54) LOCATION AWARE VOICE CALLS AND MESSAGES

(75) Inventors: Lee Begeja, Gillette, NJ (US); Kenneth H. Rosen, Middletown, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 86 days.

(21) Appl. No.: 10/782,473

(22) Filed: Feb. 18, 2004

(51) Int. Cl.
H04Q 7/20 (2006.01)

(52) U.S. Cl. .................. 5/404.1; 455/404.2; 455/456.1; 455/456.6

(58) Field of Classification Search ... 455/456.1–456.7, 455/404.1–404.2, 457, 414.1, 404.3, 404.4; 342/357.01, 357.06, 357.07, 357.08, 357.09, 342/357.1, 357.12
See application file for complete search history.

(56) References Cited

U.S. PATENT DOCUMENTS

| | | | | |
|---|---|---|---|---|
| 5,388,147 A * | 2/1995 | Grimes | ..................... | 455/404.2 |
| 5,389,934 A * | 2/1995 | Kass | ..................... | 342/357.07 |
| 5,479,482 A * | 12/1995 | Grimes | ..................... | 455/556.1 |
| 6,054,928 A * | 4/2000 | Lemelson et al. | ......... | 340/573.4 |
| 6,144,336 A * | 11/2000 | Preston et al. | ......... | 342/357.09 |
| 6,198,914 B1 * | 3/2001 | Saegusa | ..................... | 455/404.2 |
| 6,226,529 B1 * | 5/2001 | Bruno et al. | ................. | 455/557 |
| 6,477,362 B1 * | 11/2002 | Raith et al. | ............... | 455/404.1 |
| 6,477,363 B1 * | 11/2002 | Ayoub et al. | .............. | 455/404.2 |
| 6,516,198 B1 * | 2/2003 | Tendler | ..................... | 455/456.3 |
| 6,647,267 B1 * | 11/2003 | Britt et al. | ................. | 455/404.2 |
| 6,711,399 B1 * | 3/2004 | Granier | ..................... | 455/404.1 |
| 6,725,049 B1 * | 4/2004 | Williams | .................. | 455/456.1 |
| 6,839,552 B1 * | 1/2005 | Martin | ..................... | 455/404.1 |
| 6,946,977 B2 * | 9/2005 | Chen et al. | ................... | 340/988 |
| 6,996,406 B2 * | 2/2006 | Lection et al. | .............. | 455/457 |
| 2003/0135857 A1 * | 7/2003 | Pendakur et al. | .............. | 725/61 |
| 2003/0203730 A1 * | 10/2003 | Wan et al. | ................. | 455/404.2 |
| 2004/0121756 A1 * | 6/2004 | Griffin et al. | ............. | 455/404.2 |
| 2005/0043042 A1 * | 2/2005 | Hwang et al. | ............ | 455/456.2 |
| 2005/0169248 A1 * | 8/2005 | Truesdale et al. | ........... | 370/352 |

* cited by examiner

Primary Examiner—Jean A Gelin

(57) ABSTRACT

A communications network includes a mobile communications device and a communications terminal. The device and terminal are engaged in a call which includes audio stream data. An operation is performed, either at the mobile device or in the supporting network, to determine a location of the mobile communications device and link metadata representing the determined mobile communications device location to the audio stream data sent from that mobile communications device for the call. At the communications terminal, the metadata is extracted from the audio stream data to allow for presentation of the location of the mobile communications device.

30 Claims, 1 Drawing Sheet

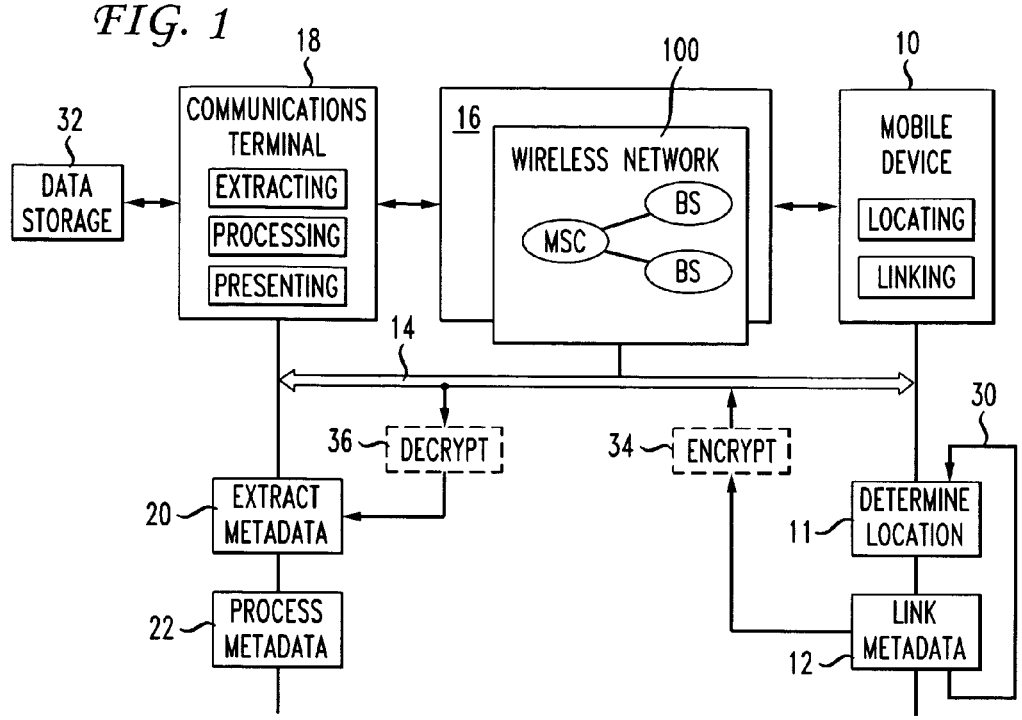
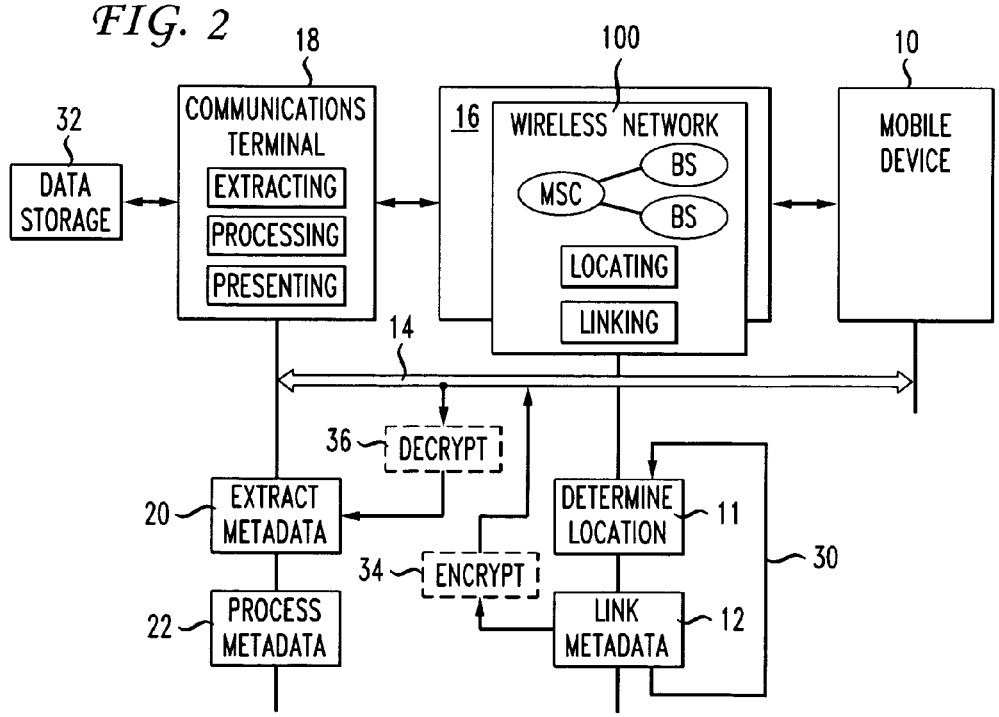

LOCATION AWARE VOICE CALLS AND MESSAGES

BACKGROUND OF THE INVENTION

1. Technical Field of the Invention

The present invention relates to locating users in a wireless communications network and, in particular, to the association of dynamic location information with calls in a wireless communications network.

2. Description of Related Art

There is a significant amount of interest in determining the location of users of wireless communications networks. For example, it has long been a goal in cellular telephone networks to be able to determine the location of cellular service users. In fact, recent legislative developments emphasize the importance of location determination and enhanced 911 (E911) service requires provision of accurate user location information for purposes of emergency call handling.

Police, fire and rescue (as well as other governmental agencies) are not the only ones interested in obtaining location information with respect to wireless (for example, cellular) communications users. It is well recognized that parents desire access to information concerning the location of their children. Additionally, businesses would like to have access to information concerning the location of their employees. A need exists in the art for a system which can deliver location information, preferably in a dynamic fashion, with respect to wireless communication users.

Additionally, it is recognized that location information may be needed with respect to recorded (for example, voice mail or surveillance) calls as well as for live or real time calls. To that end, the system should further be capable of providing, and supporting the recovery of, location data in non-real time calling situations.

SUMMARY OF THE INVENTION

A mobile communications device operates to determine its own location and then link metadata representing the determined mobile communications device location to audio stream data sent from that mobile communications device for a wireless communications call.

A wireless network node operates to determine a location of a mobile communications device in communication therewith and then link metadata representing the determined mobile communications device location to audio stream data sent from that mobile communications device for a wireless communications call.

A communications network includes a mobile communications device and a communications terminal engaged in a call which includes audio stream data. A determination of mobile communications device location is made. Metadata representing the determined mobile communications device location is then linked to the audio stream data sent from that mobile communications device. At the communications terminal, the metadata is extracted from the audio stream data and the location of the mobile communications device is presented.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 1 shows a nodal operation and signal flow diagram for a first embodiment of the present invention; and FIG. 2 shows a nodal operation and signal flow diagram for a second embodiment of the present invention.

DETAILED DESCRIPTION OF THE DRAWINGS

The general configuration and operation of wireless communication networks (such as cellular and WiFi networks, for example) is well known to those skilled in the art and thus a description of same will not be presented.

Reference is now made to FIG. 1 wherein there is shown a nodal operation and signal flow diagram for a first embodiment of the present invention. In this embodiment, which for exemplary purposes only is illustrated in the context of a conventional cellular-type wireless communications network, wireless user location is determined by the mobile communication device (for example, cell phone) 10 itself. The mobile communication device 10 may utilize any one of a number of well known location determination techniques and systems to make a location determination 11. For example, a global positioning system (GPS) receiver, or like device, may be integrated into the mobile communication device to determine its location based on received (for example, satellite) signals, and output location information (comprising location data such as, for example, geocoordinate data (longitude/latitude); geospatial data (longitude/latitude/altitude); geochronal data (location, in any suitable format, linked to a time stamp); position or map data; or other suitable location-related data, as desired). Alternatively, the mobile communication device may utilize cell detection or signal triangulation techniques to determine its location based on received wireless communications network 100 signals, and output location information (such as the location data described above).

Once user location has been determined, the obtained location information (location data) is linked 12 as metadata to the audio stream of an existing wireless communications call 14. The metadata can include data other than the location information, such as time stamp, calling/called party identification, trunk identification, call record identification, billing number identification, tracking identification, and the like, which would support data searching, data mining and/or data linking activities. This linking 12 operation can be accomplished using any one of a number of techniques. For example, in one technique, the metadata is included as in-band information along with the audio stream data. In this technique, the location data may be encoded into the audio data itself or a frame/slot in the audio stream may be stolen to carry the data. In another technique, the metadata is included as out-of-band information associated with the audio stream data. In this technique, a separate physical/logical channel may be provided to carry the data (in which case the two data streams (audio and metadata) can be linked or associated with each other using a unique identifier such as a call record). The particular technique used may depend on the nature of the wireless communications network 100 handling the wireless call 14 and/or on the nature of the location data to be communicated. It may also depend on the frequency with which the location data must be communicated.

The location metadata which is linked to the audio data stream is communicated over the infrastructure 16 of at least the supporting wireless communications network 100. This infrastructure, for example in the instance of a cellular wireless communications network, may comprise one or more base stations and one or more mobile switching centers. It should also be recognized that this infrastructure could include non-wireless communications network infrastructure, for example, comprising the public switched telephone network (PSTN).

At the other end of the wireless communications call 14 is a communications terminal 18. This communications terminal 18 may exist in either the wireless communications network 100 where the user is located or in another communications network (wireless or otherwise, for example, the PSTN). It is thus understood that the communications terminal 18 may comprise a mobile communications device and/or a fixed wireline device and/or a computer or network terminal. Alternatively, the communications terminal 18 may comprise a device located in/along the call path, not necessarily at the end, which is connected into the call (perhaps at a tap or three-way connection). The communications terminal 18 receives the audio stream data for the wireless call 14 and extracts 20 therefrom the linked metadata which identifies the location of the user. This extracted metadata may then be processed 22 as desired to provide or present at the communications terminal 18 the location of the user. As an example, the extracted metadata may be processed and converted for geographic display of user location on a map. Alternatively, the extracted metadata may be processed to determine location with the determined location communicated audibly in association with the audio stream data (for example, using a text-to-speech TTS technique).

To ensure accuracy of the location information, and to the extent the mobile communication device 10 possesses a plurality of location determination techniques and systems to make a location determination, the location data output from each technique/system is linked 12 as metadata to the audio stream of the existing wireless communications call 14. The plural location data is then recovered from the extracted 20 metadata, with the processing 22 performed on the data operating to additionally compare the associated locations against each other and then provide at the communications terminal 18 the location of the user as determined by use and comparison of the plural provided locations.

Because the user in the wireless communications network can be mobile, and further because the location of the user can change during the course of the wireless communications call 14, it is important that location be updated as the call progresses. The mobile communications device 10 accordingly further operates in a looping functionality 30 to periodically repeat the location determination 11 and linking process 12 operations. In this way, during the course of the call 14 the location data relating to the mobile communication device is periodically transmitted as metadata linked to the audio stream data. Dynamic and real time location determinations may accordingly be effectuated. Although periodic updating is preferred, it will be understood that an aperiodic update may be implemented. Additionally, whether periodic or aperiodic, the specification of when and how often an update through the looping functionality 30 is performed can be a system definable variable (having a default value).

In order to preserve the location data in association with the audio stream data, the communications terminal 18 may include a data recorder or storage system 32. Preferably, this system 32 stores the audio stream data as received by the communications terminal 18 from the communications network supporting the wireless communications call 14. In this way, the stored audio stream data will include the linked metadata representing user location. To the extent the system 32 does not store the data as described, for example, instead storing a compressed version of the voice data from which the linked metadata cannot be recovered, the extraction 20 process must nonetheless be performed and the extracted metadata stored by the system 32 in association with the stored voice data. It is not necessary to process 22 the metadata to make location determinations before storing, although if done then the location data (as opposed to the metadata) could instead be stored with the voice data.

It will, of course, be understood that this data recorder/storage system 32 may comprise a voice mail or surveillance recorder which would store not only the audio data stream, but also the linked metadata. In this way, the present invention supports both real time and non-real time location information collection with respect to received/monitored calls. Storage in this fashion also preserves the linked relationship between the call data (the audio stream) and the location data (the metadata). Other associated call data (like call record, call time, called/calling party identification, and the like) can be stored in the same relationship. This facilitates searching and cross referencing of the data for data mining and data analysis operations.

There are a number of situations where it is critical for the character and integrity of the location data to be beyond repute. For example, in the case of an employer checking on the location of employees and perhaps using the location data as evidence in connection with a performance review or a termination proceeding, actions must be taken to ensure that the employee cannot tamper with the location data or dispute its accuracy. To that end, as an additional (but certainly optional) feature, the operation taken by the mobile communications device 10 to link 12 the location data as metadata to the audio stream of the existing wireless communications call 14 can include an encryption 34 of the data. A corresponding decryption 36 of the data must be performed when the metadata is extracted 20. Any one of a number of suitable encryption/decryption (cryptographic) protocols could be used. For example, the location data could be sent unencrypted while associated data such as a time stamp is encrypted (or vice versa). Alternatively, separate encryption techniques could be used on different aspects or portions of the data. Verification of the data may also be important, and thus the encryption protocol should include a means for the sender/user to authenticate the transmission (perhaps with the use of an electronic signature). It is important that the sender/user not be able to repudiate the message.

Although a preferred implementation is to determine and transmit location information which can provide precise information as to user location, it should be recognized that location data suitable for linking as metadata can alternatively include less precise forms of location related information. For example, in the context of a cellular network implementation, the location data could simply comprise information identifying the cell which is currently serving the mobile communications device 10. In this implementation, the operation to loop 30 by the mobile communications device 10 need not be periodic and could instead be implemented to update cell location at each instance of a cell boundary crossing (for example, at each instance of a handoff of the wireless communications call 14). In any event, this process still provides for dynamic and real time location determination, and the specification of when and how often an update is made through the looping functionality 30 may specified by a system definable variable.

Reference is now made to FIG. 2 wherein there is shown a nodal operation and signal flow diagram for a second embodiment of the present invention. In this embodiment, which for exemplary purposes only is illustrated in the context of a conventional cellular-type wireless communications network, wireless user location is determined by the supporting wireless communications network 100. The network 100

(more specifically, in the cellular example, the base stations and/or mobile switching centers) may utilize any one of a number of well known location determination techniques and systems to make a location determination 11. For example, the network 100 may utilize base station cell detection or signal triangulation techniques to determine the location of a mobile communications device 10 based on received wireless communications signals, and output location information (comprising location data such as, for example, geocoordinate data (longitude/latitude); geospatial data (longitude/latitude/altitude); geochronal data (location, in any suitable format, linked to a time stamp); position or map data; or other suitable location-related data, as desired).

Once user location has been determined 11, the obtained location data (such as geocoordinate data) is linked 12 as metadata to the audio stream of an existing wireless communications call 14. The metadata can include data other than the location information, such as time stamp, calling/called party identification, trunk identification, call record identification, billing number identification, tracking identification, and the like, which would support data searching, data mining and/or data linking activities. This linking 12 operation can be accomplished using any one of a number of techniques. For example, in one technique, the metadata is included as in-band information along with the audio stream data. In this technique, the location data may be encoded into the audio data itself or a frame/slot in the audio stream may be stolen to carry the metadata. In another technique, the metadata is included as out-of-band information associated with the audio stream data. In this technique, a separate physical/logical channel may be provided to carry the data. In this technique, a separate physical/logical channel may be provided to carry the data (in which case the two data streams (audio and metadata) can be linked or associated with each other using a unique identifier such as a call record). The particular technique used may depend on the nature of the wireless communications network 100 handling the wireless call 14 and/or on the nature of the location data to be communicated. It may also depend on the frequency with which the location data must be communicated.

The location metadata which is linked to the audio data stream is communicated over the infrastructure 16 of at least the supporting wireless communications network 100. This infrastructure, for example in the instance of a cellular wireless communications network 100, may comprise one or more base stations and one or more mobile switching centers. It should also be recognized that this infrastructure could include non-wireless communications network infrastructure, for example, comprising the public switched telephone network (PSTN).

At the other end of the wireless communications call 14 is a communications terminal 18. This communications terminal 18 may exist in either the wireless communications network 100 where the user is located or in another communications network (wireless or otherwise, for example, the PSTN). It is thus understood that the communications terminal 18 may comprise a mobile communications device and/or a fixed wireline device and/or a computer or network terminal. Alternatively, the communications terminal 18 may comprise a device located in/along the call path, not necessarily at the end, which is connected into the call (perhaps at a tap or three-way connection). The communications terminal 18 receives the audio stream data for the wireless call 14 and extracts 20 therefrom the linked metadata which identifies the location of the user. This extracted metadata may then be processed 22 as desired to provide or present at the communications terminal 18 the location of the user. As an example, the extracted metadata may be processed and converted for geographic display of user location on a map. Alternatively, the extracted metadata may be processed to determine location with the determined location communicated audibly in association with the audio stream data (for example, using a text-to-speech TTS technique).

To ensure accuracy of the location information, and to the extent the wireless communications network 100 possesses a plurality of location determination techniques and systems to make a location determination, the location data output from each technique/system is linked 12 as metadata to the audio stream of the existing wireless communications call 14. The plural location data is then recovered from the extracted 20 metadata, with the processing 22 performed on the data operating to additionally compare the associated locations against each other and then provide at the communications terminal 18 the location of the user as determined by use and comparison of the plural provided locations.

Because the user in the wireless communications network can be mobile, and further because the location of the user can change during the course of the wireless communications call 14, it is important that location be updated as the call progresses. The supporting wireless communications network 100 accordingly further operates in a looping functionality 30 to periodically repeat the location determination 11 and linking process 12 operations. In this way, during the course of the call 14 the location data relating to the mobile communication device is periodically transmitted as metadata linked to the audio stream data. Dynamic and real time location determinations may accordingly be effectuated. Although periodic updating is preferred, it will be understood that an aperiodic update may be implemented. Additionally, whether periodic or aperiodic, the specification of when and how often an update through the looping functionality 30 is performed can be a system definable variable (having a default value).

In order to preserve the location data in association with the audio stream data, the communications terminal 18 may include a data recorder or storage system 32. Preferably, this system 32 stores the audio stream data as received by the communications terminal 18 from the communications network 100 supporting the wireless communications call 14. In this way, the stored audio stream data will include the linked metadata representing user location. To the extent the system 32 does not store the data as described, for example, instead storing a compressed version of the voice data from which the linked metadata cannot be recovered, the extraction 20 process must nonetheless be performed and the extracted metadata stored by the system 32 in association with the stored voice data. It is not necessary to process 22 the metadata to make location determinations before storing, although if done then the location data (as opposed to the metadata) could instead be stored with the voice data.

It will, of course, be understood that this data recorder/storage system 32 may comprise a voice mail or surveillance recorder which would store not only the audio data stream, but also the linked metadata. In this way, the present invention supports both real time and non-real time location information collection with respect to received/monitored calls. Storage in this fashion also preserves the linked relationship between the call data (the audio stream) and the location data (the metadata). Other associated call data (like call record, call time, called/calling party identification, and the like) can be stored in the same relationship. This facilitates searching and cross referencing of the data for data mining and data analysis operations.

There are a number of situations where it is critical for the character and integrity of the location data to be beyond repute. For example, in the case of an employer checking on the location of employees and perhaps using the location data as evidence in connection with a performance review or a termination proceeding, actions must be taken to ensure that the employee cannot tamper with the location data or dispute its accuracy. To that end, as an additional (but certainly optional) feature, the operation taken by the wireless communications network 100 to link 12 the location data as metadata to the audio stream of the existing wireless communications call 14 can include an encryption 34 of the data. A corresponding decryption 36 of the data must be performed when the metadata is extracted 20. Any one of a number of suitable encryption/decryption (cryptographic) protocols could be used. For example, the location data could be sent unencrypted while associated data such as a time stamp is encrypted (or vice versa). Alternatively, separate encryption techniques could be used on different aspects or portions of the data. Verification of the data may also be important, and thus the encryption protocol should include a means for the sender/user to authenticate the transmission (perhaps with the use of an electronic signature). It is important that the sender/user not be able to repudiate the message.

Although a preferred implementation is to determine and transmit location information which can provide precise information as to user location, it should be recognized that location data suitable for linking as metadata can alternatively include less precise forms of location related information. For example, in the context of a cellular network implementation, the location data could simply comprise information identifying the cell which is currently serving the mobile communications device 10. In this implementation, the operation to loop 30 by the serving wireless communications network 100 need not be periodic and could instead be implemented to update cell location at each instance of a cell boundary crossing (for example, at each instance of a handoff of the wireless communications call 14). In any event, this process still provides for dynamic and real time location determination, and the specification of when and how often an update is made through the looping functionality 30 may specified by a system definable variable.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A mobile communications device, comprising:
   means for determining mobile communications device location;
   means for encrypting the determined mobile communications device location; and
   means for linking metadata, representing the encrypted determined mobile communications device location and call related data, to audio stream data sent from the mobile communications device for a wireless communications call using a call record associated with said wireless communications call, wherein said metadata is carried out of band on a channel separate from said audio stream data.

2. The device as in claim 1, wherein the means for determining comprises a processing technique selected from the group consisting of global positioning system (GPS) location determination, wireless network signal triangulation location determination, and serving cell identification determination.

3. The device as in claim 1, wherein the means for linking operates in a repetitive and periodic manner during the course of the wireless communications call to link said metadata.

4. The device as in claim 1, wherein the determined location is an identification of a cell currently serving the mobile communications device and the means for linking operates to link in response to detected changes in the currently serving cell.

5. The device as in claim 1, wherein the metadata comprises a time stamp in addition to the determined location.

6. The device as in claim 1, wherein the call related data is selected from the group consisting of a call record, called/calling party identification, and billing number identification.

7. A wireless network node, comprising:
   means for determining location of a mobile communications device in communication with the node;
   means for encrypting the determined location of the mobile communications device; and
   means for linking metadata, representing the encrypted determined mobile communications device location and call related data, to audio stream data sent from said mobile communications device for a wireless communications call using a call record associated with said wireless communications call, wherein said metadata is carried out of band on a channel separate from said audio stream data.

8. The node as in claim 7, wherein the means for determining performs a processing technique selected from the group consisting of wireless network signal triangulation location determination, and serving cell identification determination.

9. The node as in claim 7, wherein the means for linking operates in a repetitive and periodic manner during the course of the wireless communications call to link said metadata.

10. The node as in claim 7, wherein the determined location is an identification of a cell currently serving the mobile communications device and the means for linking operates to link in response to detected changes in the currently serving cell.

11. The node as in claim 7, wherein the metadata comprises a time stamp in addition to the determined location.

12. The node as in claim 7, wherein the call related data is selected from the group consisting of a call record, called/calling party identification, and billing number identification.

13. A communications network, comprising:
   a mobile communications device;
   a communications terminal, wherein the mobile communications device and communications terminal are connected to a call which includes audio stream data;
   means for determining location of the mobile communications device;
   means for encrypting the determined location of the mobile communications device;
   means for linking metadata, representing the encrypted determined mobile communications device location and call related data, to the audio stream data sent from the mobile communications device using a call record associated with said call, wherein said metadata is carried out of band on a channel separate from said audio stream data; and
   means at the communications terminal for presenting the location of the mobile communications device.

14. The network as in claim 13, wherein the means for determining and means for linking are located within the mobile communications device.

15. The network as in claim 13, wherein the means for determining and means for linking are located within a network node of the communications network.

16. The network as in claim 13, wherein the means for determining performs a processing technique selected from the group consisting of global positioning system (GPS) location determination, wireless network signal triangulation location determination, and serving cell identification determination.

17. The network as in claim 13, wherein the means for linking operates in a repetitive and periodic manner during the course of the call to link said metadata.

18. The network as in claim 13, wherein the determined location is an identification of a cell currently serving the mobile communications device and the means for linking operates to link in response to detected changes in the currently serving cell.

19. The network as in claim 13, wherein the metadata comprises a time stamp in addition to the determined location.

20. The network as in claim 13, wherein the call related data is selected from the group consisting of a call record, called/calling party identification, and billing number identification.

21. The network as in claim 13, wherein the communications terminal is a surveillance device connected into the call.

22. The network as in claim 13, wherein the communications terminal is a voice recording device connected to the call.

23. A method comprising:
   determining a location of a mobile communications device;
   encrypting the determined location of the mobile communications device; and
   linking metadata, representing the encrypted determined mobile communications device location and call related data, to audio stream data sent from the mobile communications device for a wireless communications call using a call record associated with said wireless communications call, wherein said metadata is carried out of band on a channel separate from said audio stream data.

24. The method as in claim 23, wherein said step of determining comprises location processing as selected from the group consisting of global positioning system (GPS) location determining, wireless network signal triangulation location determining, and serving cell identification determining.

25. The method as in claim 23, wherein said step of linking includes operating in a repetitive and periodic manner during the course of the wireless communications call to link said metadata.

26. The method as in claim 23, wherein the determined location is an identification of a cell currently serving the mobile communications device and said step of linking includes operating to link in response to detected changes in the currently serving cell.

27. The method as in claim 23, further comprising:
   extracting the metadata from the audio stream data; and
   presenting the location of the mobile communications device.

28. The method as in claim 23, wherein the metadata comprises a time stamp in addition to the determined location.

29. The method as in claim 23, wherein the call related data is selected from the group consisting of a call record, called/calling party identification, and billing number identification.

30. The method as in claim 23, further comprising recording the audio stream data and linked metadata.

* * * * *